United States Patent [19]
Bangert et al.

[11] Patent Number: 5,537,866
[45] Date of Patent: Jul. 23, 1996

[54] METHOD AND DEVICE FOR CORRECTING IMBALANCE OF PNEUMATIC VEHICLE TIRES BY REMOVING BEAD MATERIAL

[75] Inventors: Heinz-Albert Bangert, Korbach; Karl-Heinz Evertz, Herzogenrath; Klaus Kleinhoff, Rodenberg; Manfred Thomas; Erich Buschmann, both of Korbach, all of Germany

[73] Assignee: Continental Aktiengesellschaft, Hanover, Germany

[21] Appl. No.: 344,934

[22] Filed: Nov. 23, 1994

[30] Foreign Application Priority Data

Nov. 23, 1993 [DE] Germany .................. 43 39 775.1

[51] Int. Cl.⁶ .................. G01M 1/34; G01M 1/16
[52] U.S. Cl. .................. 73/146; 451/242; 451/249; 451/51
[58] Field of Search .................. 73/146, 8, 468; 301/5.21, 5.22; 152/154.1; 74/573 R; 29/901; 451/242, 246, 249, 258, 231, 233, 51, 57

[56] References Cited

U.S. PATENT DOCUMENTS

| 3,550,442 | 12/1970 | Carr et al. |  |
|---|---|---|---|
| 3,719,813 | 3/1973 | Friedman et al. |  |
| 3,862,570 | 1/1975 | Ongaro |  |
| 4,016,020 | 4/1977 | Ongaro | 156/75 |
| 4,414,843 | 11/1983 | Kounkel et al. | 73/66 |

FOREIGN PATENT DOCUMENTS

| 0405297 | 1/1991 | European Pat. Off. |
|---|---|---|
| 2715111 | 10/1978 | Germany . |
| 61-195809 | 8/1986 | Japan . |

*Primary Examiner*—Richard Chilcot
*Assistant Examiner*—Joseph L. Felber
*Attorney, Agent, or Firm*—Robert W. Becker & Associates

[57] ABSTRACT

A method for correcting tire imbalance of a tubeless pneumatic vehicle tire includes the step of mounting the tire on a master wheel rim of great manufacturing precision and having a design that is identical at least in its seat surface to commercial wheel rims for the tire. The tire is inflated to a pressure within a range of −0.3 bar to +0.2 bar of a maximum operating pressure. The pneumatic vehicle tire mounted on the master wheel rim is pressed against a measuring device. At least one radial parameter is measured. The values of the radial parameter are recorded as a function of the angle of rotation from 0° to 360° of the tire. The maximum and the minimum of the radial parameter is determined and the difference between the maximum and minimum is calculated. The difference is compared to a predetermined threshold value. The bead of the tire, when the difference between the maximum and the minimum is above the threshold value, is corrected. Correction includes the step of removing at locations, where the value of the radial parameter is greater than the minimum plus the threshold value, tire material from the radially inwardly facing seat surface of the tire bead at least to such an extent that the remaining tire imbalance is within a given tolerance range.

18 Claims, 6 Drawing Sheets

METHOD AND DEVICE FOR CORRECTING IMBALANCE OF PNEUMATIC VEHICLE TIRES BY REMOVING BEAD MATERIAL

BACKGROUND OF THE INVENTION

The present invention relates to a method for correcting imbalance of vehicle tires, preferably tubeless tires with a radial carcass for passenger cars with wheel rims that have a 5° seat surface whereby each tire is first mounted onto a master wheel rim that, in addition to having been manufactured with great precision, corresponds substantially to the commercial wheel rims of the corresponding tire, which tire is subsequently inflated to a pressure within a range of –0.3 bar to +0.2 bar of the preset maximum operating pressure. Subsequently, the wheel comprised of the master wheel rim and the tire to be corrected is pressed against a measuring device, for example, a roller shaped force measuring device, and at least one radial parameter is measured, preferably electronically, as a function of the rotational angle of the wheel covering the complete range of 0° to 360°. The values of the radial parameter are recorded and, subsequently the minimum and the maximum values are determined. Then the difference between the two extreme values, i.e., the maximum force, respectively, maximum radius deviation, is determined and this difference is compared with the allowed maximum threshold value, whereafter the tires, the maximum deviation of which surpasses a preset tolerance value, are subjected to a correction within the bead area.

Such a prior art method is disclosed in German Offenlegungsschrift 27 15 111. The disclosed method is designed to reduce imbalances, especially dynamic imbalances of the tire. For this purpose, on the axially inner side of the tire bead additional rubber is supplied for subsequent trimming operations (see FIGS. 2 and 3 of the disclosure) or is removed at opposite locations.

Since it is not necessary to balance the tire and the wheel rim independently, and since it is essentially sufficient to balance both together with the other components that make up the finished wheel, for example, the valve and optionally the brake disks, respectively, the brake drums, and since furthermore a fixation of the balance weights at the wheel rim can be realized very easily, especially without having to mount the tire again after imbalance measurement, the described prior art method has not been used in practice. Furthermore, the chassis vibrations that can be detected in the interior of the vehicle on a planar road surface are not only the result of non-uniform mass distribution that can be compensated by balancing, but furthermore also depend on stiffness and radius fluctuations.

In the following it is presupposed that according to conventional methods the mass distribution of a wheel can be made sufficiently uniform by correct placement of balance weights. Thus, the object remains to reduce the still present force fluctuations, especially of the radial force, to a tolerable magnitude. The value of tolerable magnitude is essentially determined by the customer and depends essentially on the comfort level expected within a vehicle class, the ratio between the sprung and unsprung masses, the maximum allowable, respectively, maximum possible velocity, and also the willingness to pay a higher price for an optimized balancing of the tires. For a conventional wheel contact force of approximately 3,150 Newton on the higher load axle of contemporary mid-size vehicles, the initial manufacturer's tire package for a new car conventionally allows for a maximum fluctuation of the radial force (=maximum–minimum) over the circumference of approximately 100 Newton which corresponds to +/–1.6%.

Since not all tires after vulcanization fulfill such balance requirements, it is known to correct the tires, which do not correspond to the aforementioned tolerance range, after vulcanization. In Germany, the term of the art for such a process is harmonizing. The conventional harmonizing process is comprised of grinding the tread surface. This method thus accepts the fact that the depth of the tire tread is locally reduced. However, this measure can only be applied within very small limits, conventionally of up to 0.5 mm.

European Patent 0 405 297 teaches that for tires that are mounted onto 5° wheel rims a different harmonizing method can be employed. So-called 5° wheel rims are conventional on all passenger cars and lightweight commercial vehicles such as Ford Transit, VW bus, Renault Traffic etc. According to the disclosed method, between the rim flanges which extend substantially vertically to the axis of the tire and the corresponding bead surface a washer-type disk is to be placed the thickness (axial dimension) of which is proportional to the imbalance to be compensated: at locations where the measured radial force is greater than the average radial force over the circumference, the washer-type disk is to be extra thick and at locations where the actual radial force is smaller than the average radial force the washer-type disk is especially thin. With such a compensation measure it is indeed possible to reduce the peak/peak values of the radial force function over the circumference. However, the tire bead in this arrangement is positioned on the wheel rim further axially inwardly, where the wheel rim diameter is smaller, and the contact pressure between the radial inner bead surfaces, especially of the sealing toe, and the wheel rim seat surface is reduced. This negatively effects the throw-off safety. Even at locations where the radial force without correction is within the tolerance range, the bead of the tire is axially inwardly displaced because the washer-type disk must have a minimum thickness for reasons of rigidity and stiffness. Furthermore, the radially inwardly displaced and thus axially inwardly pulled sidewall of the tire results in a reduction of the edge climbing capability of the wheel as known from wheel rims with narrowly spaced rim flanges. This will result in problems especially for vehicles that are mostly used in inner city traffic. Also, this increases the likelihood of damage to the wheel rim flanges when contacting the curb edges.

Furthermore, it is in general undesirable to increase the number of components to be joined because this increases the likelihood of incorrect mounting which could lead to enlarging the imbalance to be compensated.

The same patent disclosure also teaches for so-called 15° wheel rims (conventionally employed for medium-size and heavy trucks) to use such washer-type disks that are to be adapted in their thickness over the circumference of the wheel rim to the radial force function and are to be positioned between wheel rim and tire bead. The suggested position is not between wheel rim flange and bead surface, but between the radially inner seat surface of the wheel rim that is slanted at an angle of 15° and the matching bead surface. The thickness (radial dimension) should be selected proportional to the imbalance to be compensated whereby at locations where the local radial force is greater than the average radial force over the circumference, the washer-type disk should be especially thin and at locations where the actual radial force is smaller than the average radial force, the washer-type disk should be especially thick.

This method, which requires the use of smaller seat surface diameters of the wheel rim when using conventional tires or an increased bead diameter of the tires when using conventional wheel rims in order to provide sufficient radial constructive space for the washer-type disks designed to compensate for the radial forces, increases not only the parts needed to mount a wheel, but also increases the number of parts for each type of vehicle. This is in practice unacceptable.

It is therefore an object of the present invention to provide a correcting method for reducing at least the radial force fluctuations of pneumatic vehicle tires which does not require additional parts for the wheel and which also does not increase the multiplicity of parts. Furthermore, any negative effect on other tire properties should be avoided. Especially the edge climbing capability and protection of the flange of the wheel rim should remain unaffected.

SUMMARY OF THE INVENTION

The method for correcting tire imbalance of a tubeless pneumatic vehicle tire according to the present invention is primarily characterized by the following steps:

Mounting a pneumatic vehicle tire on a master wheel rim of great manufacturing precision and having a design that is identical at least in its seat surface to commercial wheel rims for the tubeless pneumatic vehicle tire;

Inflating the pneumatic vehicle tire to a pressure within a range of −0.3 bar to +0.2 bar of a maximum operating pressure;

Pressing the pneumatic vehicle tire mounted on the master wheel rim against a measuring device;

Measuring at least one radial parameter;

Recording the values of the radial parameter as a function of the angle of rotation over the complete range from 0° to 360° of the pneumatic vehicle tires;

Determining the maximum and the minimum of the values of the radial parameter;

Calculating the difference between the maximum and the minimum;

Comparing the difference between the maximum and the minimum with a predetermined threshold value; and Correcting the bead of the tire when the difference between the maximum and the minimum is above the threshold value, wherein the correcting step includes the step of removing at locations, where the value of the radial parameter is greater than the minimum plus the threshold value, tire material from the radially inwardly facing seat surface of the bead of the tire at least to such an extent that the remaining tire imbalance is within a given tolerance range.

Preferably, the step of removing includes the step of grinding. In another embodiment of the present invention, the step of removing includes the step of using a laser.

Advantageously, the step of removing is carried out only over a circumferential portion of the bead of the pneumatic vehicle tire.

Advantageously, the method further comprises the step of:

Before the step of correcting clamping the tire in a device that receives a portion of a circumferential length of the bead of an angular range of between 200° and 310° in the manner of a wheel rim so that the circumferential portion of the bead from which tire material is to be removed is left unobstructed.

Preferably, the method further includes the steps of:

Evaluating the values of the radial parameter as a function of the angle of rotation from 0° to 360° of the pneumatic tire so as to determine the first harmonic; and Selecting the amount of removal of tire material to be within the dimensional limits of the bead and the allowable removal range such that the amplitude of the first harmonic is lowered as much as possible.

Preferably, the step of evaluating includes the step of using Fourier analysis.

Advantageously, in the step of measuring at least one radial parameter the radial force is measured. Preferably, the method further comprises the step of measuring the axial force.

Expediently, in the step of measuring the radial force is measured in two adjacent tracks, wherein the measured results of the left track affect the removal of tire material at the left bead of the tire and the measured results of the right track affect the removal of tire material at the right bead.

In another embodiment of the present invention in the step of measuring at least one radial parameter the radius is measured.

Preferably, the radius is measured at two locations axially spaced from the zenith of the tire to the left and to the right wherein the measured values of the left location affect the removal of tire material at the left bead and the measured values of the right location affect the removal of tire material at the right bead.

Advantageously, the two locations are substantially positioned above the left and right beads.

The present invention further relates to a device for correcting tire imbalance of a tubeless pneumatic vehicle tire according to the inventive method. The device preferably comprises a clamping device having a support structure designed substantially identical to a wheel rim and having a cutout over a circumferential portion of the support structure and having a tool positioned in the cutout for removing tire material.

Advantageously, the cutout extends over an anglular range of 50° to 160°.

Preferably, the clamping devices comprises outer clamping jaws that are shaped identical to the wheel rim seat and inner clamping jaws for receiving the bead of the tire therebetween so as to be fixedly clamped. Preferably, the inner clamping jaws have an inflatable hose for clamping.

Advantageously, the clamping device is comprised of a first part with a first cutout for receiving the right bead of the tire and a second part with a second cutout for receiving the left bead of the tire. The first and second parts are rotatably connected to one another such that the first cutout and the second cutout can be positioned at any desired rotational position relative to one another thereby allowing the removal of tire material at different circumferential locations of the left and the right beads of the tire.

According to the present invention, at locations where the local radial forces, respectively, the local tire radius is greater than the minimum plus the tolerance value, tire material is removed at the radially inwardly facing seat surface of the tire bead at least to such an extent that subsequently the remaining fluctuations are within the tolerance range. Where not the radial force fluctuation itself is the removal criterium, but the first harmonic thereof (in most cases the tolerance is given for the first harmonic), it is obvious that, at the location and its surroundings where the greatest radial force fluctuation is present, so much material of the tire must be removed that the amplitude of the aforementioned first harmonic is reduced to the tolerable value.

The removal of tire material can be performed by grinding. This is especially inexpensive, and the same tools can be used that are known for grinding the tread surface. As a similar removal technique it is also possible to use peeling or cutting whereby for the same amount of tire material to be removed fewer and larger cuttings will result. The reaction force (which is a limit to the achievable precision) exerted in the radial direction from the cutting tool onto the bead to be machined is however not greater than during grinding because the cutting angle of the cutting tool can be selected to be more acute than for a grinding tool. The surface properties resulting from the different methods do not exhibit substantial differences.

However, there are differences between the two variations with respect to environmental issues. Grinding has the advantage that the resulting rubber meal can be more easily added to rubber mixtures, but has the disadvantage of a higher dust loading at the workplace. These differences are without consequence for the inventive imbalance correction. The cutting process is thus considered within the context of this invention as an equivalent removal process to the more conventional grinding process.

An especially preferred variation of the inventive method is provided by using a laser beam. In this method, the tire to be machined has no tendency to yield to the tool. Furthermore, this removal method is free of tool wear, but requires a higher energy consumption due to the low efficiency of the available lasers. Of the lasers known at present the $CO_2$ type seems to be the preferred tool. The resulting waste products, especially the waste gas, have not been researched completely.

It is the gist of the invention that in contrast to the prior art in which something is added to the vulcanized tire, certain amounts of tire material are removed from the tire at the radially inner bead surface. In this context, the rubber envelope of the bead must be thicker by a minimum amount than the maximum allowable amount of removal. This minimum amount depends on the load to be expected. For conventional automobile tires this amount is approximately 0.6 mm, but more for truck tires. The remaining minimum amount protects the folded carcass against frictional wear and moisture influence during transport, storage, and mounting. The conventional envelope thickness is usually above the required minimum value so that the difference between actual envelope thickness and minimum required envelope thickness can be used as the maximum amount of removal.

Of course, the inventive removal of tire material changes the so-called bead characteristic which is the observed areal pressure (contact pressure) as a function of the actual wheel rim seat circumference. For a maximum amount of removal of 0.5 mm and an angular range of removal of 90°, whereby the removal at the borders of this angular range are to be continuous, preferably of continuous differentiability, with a sufficiently small slope in order not to endanger the tire-wheel rim sealing action, the average bead diameter over the circumference only grows by about 0.15 mm. Correspondingly, the bead characteristic after removal at the point (far to the left of the actual tolerance range) where wheel rim seat circumference and bead circumference coincide (areal pressure 0), is shifted to the right by about 0.15 mm and is thus deeper. However, the slope of the characteristic is considerably greater (by about 20%) so that within the tolerance range the contact pressure decrease is partially compensated. For many tire types the remaining contact pressure decrease, respectively, the displacement of the seat tolerance range, is so small that, in comparison to the other effects, it is negligible.

In an especially preferred embodiment of the invention the rubber envelope of the bead, already within the green tire, is made to be somewhat thicker, for example, by 0.15 mm, in comparison to conventional embodiments. In the aforementioned example the same bead characteristic that is exhibited by the tire type with a bead not subjected to grinding would result with the inventive removal. However, a somewhat stiffer characteristic of the tires that are not harmonized must be accepted with this embodiment.

Furthermore, after increasing the envelope thickness, for example, from 0.95 mm to 1.1 mm, the maximum allowable amount of removal can be increased from 0.35 mm to 0.5 mm. It may furthermore be expedient to increase the bead core diameter somewhat for tires that are to be harmonized by removal of tire material from the bead.

Based on a tire of the prior art, which can be harmonized within the tread area, the increase in the thickness of the rubber envelope is defined as X and the ratio of angular range within which tire material is to be removed to the full angular range is defined as Y (in the aforementioned example Y=0.25). The optimum increase of bead core diameter is then approximately defined as XY (in the aforementioned example 0.04 mm). The resulting weight increase is negligible and is smaller by orders of magnitude in comparison to the weight savings within the tread area resulting from the invention because the tread surface no longer must be made thicker by the harmonizing value which is necessary for maintaining the minimum tread depth demanded by the customer.

First experiments have shown that most conventional tire types have enough tire material present in order allow removal of tire material according to the present invention without damaging the folded carcass ends and without reducing in an undesirable manner the press fit of the tire bead at the wheel rim.

In addition to the questions where at which component, i.e., radial inner side of the bead and how (with which measure, i.e., removal) action should be taken, it is a decisive factor for the success of the present invention to find a fitting (mathematical) equation for the amount of removal as a function of the rotational angle. The first step for finding such an equation, in the following referred to as the removal function, is, as is known from the prior art, to measure the imbalance (flaw) to be compensated.

While it is suggested in the aforementioned German Offenlegungsschrift 27 15 111 to measure the tire at high circumferential speeds, (corresponding to conventional highway speeds), the European Patent 0 405 297 employs conventional quasi-static measurements, i.e., a measurement where the mass forces practically do not have any influence.

The present invention is not depending on a low measuring velocity because the flaw or imbalance is not graphically recorded, as suggested by European Patent 0 405 297, but is preferably electronically recorded.

The electronic recording has the advantage that a plurality of sequentially measured periods (360°) can be averaged, i.e., the value of the flaw or imbalance at X° can be added to $(X+360)°$, $(X+2\times360)°$, $(X+3\times360)°$ ... $(X+\mu\times360)°$ until all the flaw values have been added up. Subsequently the result is divided by $(\mu+1)$. X can assume any value in the angular range between 0° and 360° and $\mu$ is a natural number. With this method accidental measuring mistakes can be substantially suppressed.

The invention also allows any variant with respect which parameter should be measured. It is, for example, possible to measure the tire tread radius with its fluctuations. When the tire tread radius is measured, this is conventionally performed at the zenith (apex) of the tire.

However, often the tire tread radius not only fluctuates over the circumference (that is over the rotational angle), but also over the axial direction. Such flaws can also be taken into consideration by measuring the tire tread radius at a certain axial distance on opposite sides of the zenith, preferably in two tracks. Such measurements are most preferably carried out essentially above the left bead (where the latter should be positioned in the mounted state) and one essentially positioned above the right tire bead. In this manner, an incidental tire conicity, including its fluctuations, can also be recorded. The positioning of the measuring probes above the bead cores has the advantage that without data blending and mixing between the data of the left and the right measuring track the required removal at the left or right bead can be determined. However, when the measuring track distance deviates considerably from the distance between the tire core centers on the designated wheel rim, a data blending and mixing is required which will be explained in the following.

A is the distance of bead core center to bead core center and M is the distance of measuring track center to measuring track center whereby the tire bead cores as well as the measuring tracks are arranged symmetrically to the center plane of the tire. $R_1$ is the radius measured on the left measuring track and $R_r$ is the radius measured at the right measuring track. $R_{min}$ is the minimum of the two radii measured at the right and the left measuring tracks. Y is the ratio of radial extension of the tire material below the bead cores in the uncompressed state relative to the compressed state (mounted state). Y in most tires is within a range of 1.2 to 1.4. The required amount of removal for complete imbalance compensation for the tire tread radius for the left bead is $D_1$ and for the right bead is $D_r$. Given a uniform pressure distribution over the axial direction, the following equation results:

$$D_1 = Y \times \left( \frac{R_1 + R_r}{2} + \frac{R_1 - R_r}{2} \times \frac{A}{M} - R_{min} \right)$$

$$D_r = Y \times \left( \frac{R_1 + R_r}{2} + \frac{R_1 - R_r}{2} \times \frac{A}{M} - R_{min} \right)$$

which is equivalent to $$D_1 = Y \times \left( R_1 \frac{1 + \frac{A}{M}}{2} + R_r \frac{1 - \frac{A}{M}}{2} - R_{min} \right)$$

$$D_r = Y \times \left( R_1 \frac{1 + \frac{A}{M}}{2} + R_r \frac{1 - \frac{A}{M}}{2} - R_{min} \right).$$

For A/M substantially equal to 1, the measured results of the left measuring track substantially influence only the amount of removal at the left bead and the measured results at the right measuring track affect only the amount of removal at the right bead.

The measurement of the radii has the advantage that it is especially easily reproducible, can be achieved with low power output, and allows for relatively easy correlation of the required amount of removal to the measured flaws, including conicity. In the preferred quasi-static measurement the radial force fluctuations, detected within the interior of the vehicle as vibrations, are correlated via the radial stiffness (elasticity) of the tires (and also of the wheel rims) with the radius fluctuations.

However, wheel vibrations often are not the result simply of radius fluctuations, but are also caused by stiffness fluctuations that cannot be derived from measuring the radius. In this case it is advantageous to use the essentially known radial force measurement.

In the simplest case the radial force measurement can take place by pressing a reference roller against the wheel. The reference roller is conventionally made of steel and may be, which is however not preferred for the inventive measurement, provided with an asphalt coating for simulating driving conditions on road surfaces. The radial force at the wheel or at the reference roller is detected with this arrangement.

Higher measuring speeds are possible when the measured results are processed with a program for mathematical elimination of inertia effects.

However, such a measurement design cannot detect the incidentally present conicity of the tire which, in general, also fluctuates over the circumference of the tire. Such a detection should preferably be also possible. For detecting the conicity three options are available during radial force measurement:

As a first option it is possible to measure the radial force simultaneously to a two-track radius measurement in two adjacently positioned tracks whereby one track is positioned to the left and one track is positioned to the right of the central plane of the tire. The results of the left measuring track are applied mainly to the removal of tire material at the left bead and the measured results at the right track are primarily used for determining the amount of removal at the right bead. In this context it is preferred that the distance between the centers of the measuring tracks be smaller than the distance of the beads, preferably a little less than half the width of the tire tread, so that the reference rollers of both measuring tracks in their axial extension together cover substantially the entire width of the tire tread. This requires data blending as has been explained supra in conjunction with the radii measurement. Such data processing does not present any problems.

In another option it is possible to use an axially undivided reference roller and determine bearing reaction forces separately. When the left bearing of the reference roller is positioned in the axial plane of the left tire bead and correspondingly the right bearing of the reference roller is positioned in the axial plane of the right bead, the left force data set has an influence only on the removal of material at the left bead and the right force data set has an influence only on the removal at the right bead. When the axial distance of the bearings differs from the distance between the beads, a data blending between right and left side is to be performed in analogy to the explanation given in context with the radius measurements.

As a third option, the conicity (this has been tested successfully by the inventors) can be detected such that in addition to the radial force also axial forces with their fluctuations can be measured. A tire to be measured has the property, on a road surface as well as on the cylindrical reference rollers, to roll to the side where its radius is smaller. Preferably, for a reversed rotational orientation the measurements are carried out at the same speed and, as a conicity-based axial force, the arithmetic mean of both measurements is used. The conicity-based axial force, which can be corrected with the inventive grinding of the beads, without making a non-directional tire into a directional tire, is to be differentiated from axial forces of other causes, for example, slanted transverse grooves, the orientation of which will be reversed upon reversing the direction of rotation. However, the non-conicity-based axial forces for most tire types have only low priority.

During the removal of tire material from the bead the tire cannot be mounted on a complete rim because the bead would then not be inaccessible. For this reason, in the prior art it was not the bead but the tread surface that was to be ground.

European Patent 0 405 297 thus does not provide any suggestion to accomplish a removal of material within the bead area of the tire while simultaneously clamping the bead; instead, a circumvention of this problem is suggested by adding material to the bead instead of removing material from the bead.

According to the present invention the tire, after having been measured on the master wheel rim and after determining the bead areas to be machined (which may be a different area for the left bead than for the right bead), is removed from the master wheel rim and is fastened on a device that receives the respective bead over an angular range of 200° to 310° in the manner of a wheel rim in order to be able to remove the previously determined amount of tire material at the unobstructed bead area within the remaining angular range of 160° to 50°. It is possible, even though more complicated, to rotate the tire after the first removal step relative to the clamping device and after newly clamping the tire within the clamping device to remove more material at a different location of the bead. However, when limiting the method to the most important object of the invention, i.e., the reduction or elimination of the first harmonic, it is preferred to perform harmonization in one single clamping step.

Expediently, during removal of material from the tire bead, the tire bead is pressed from its inner side against the wheel rim-like centering device with corresponding clamping jaws.

An unobstructed angular range of approximately 90° has proven successful in practical experiments on automobile tires. When the bead core in relation to the circumferential length is stiffer in the radial plane with respect to bending actions, for example, in truck tires, a greater angular range may be unobstructed while in cases where the bead core is softer, for example, in motorcycle tires, a smaller range may be left unobstructed for further machining. The unobstructed space may be selected to be greater when the reactive force of the removal tool is smaller. A laser apparatus is advantageous for removal since no reactive forces are exerted onto the tire.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 6.

Figure 1:
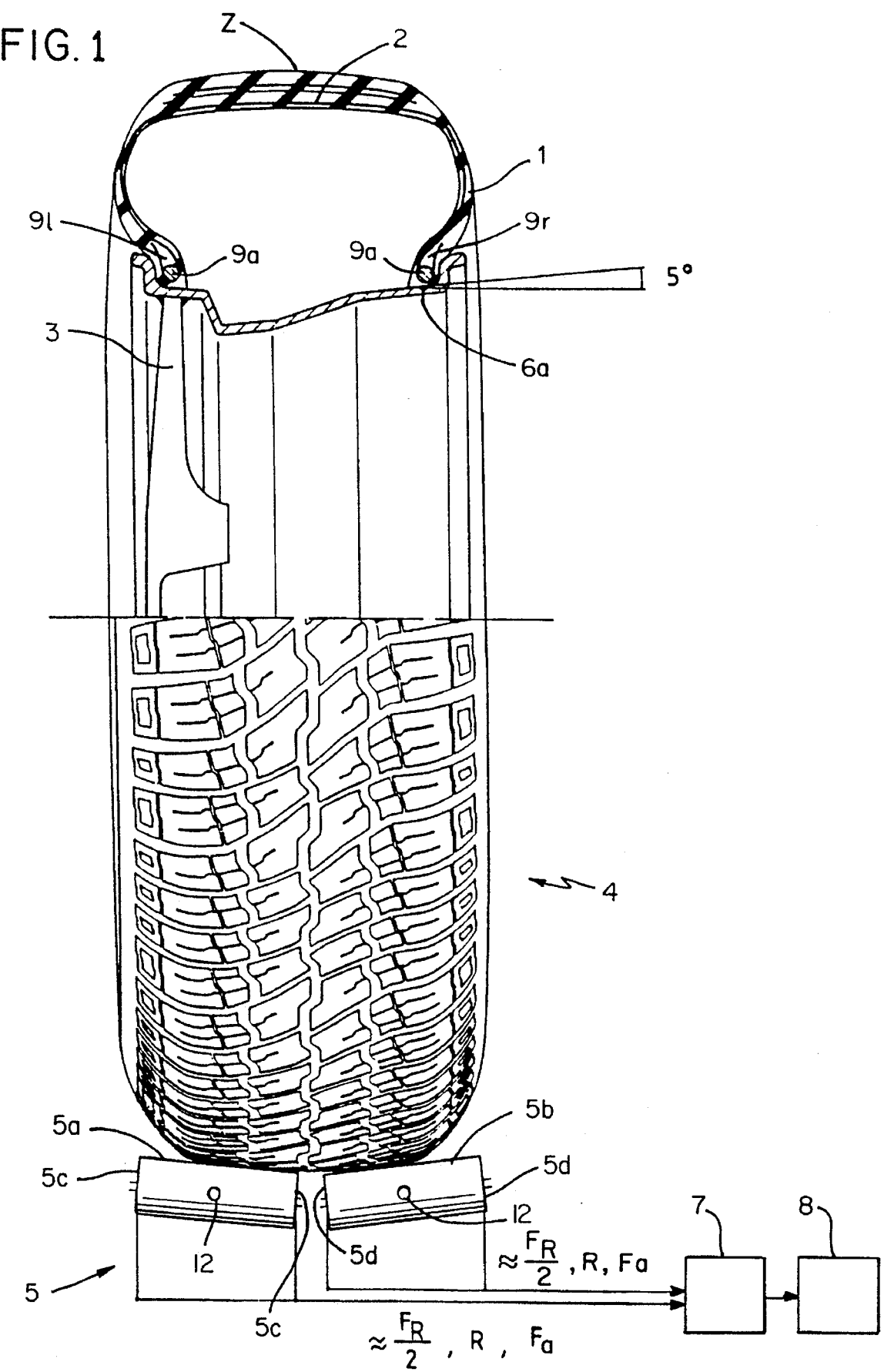
FIG. 1 shows a measuring arrangement for measuring the trueness (truth or rotation, imbalance) of the tire, in the shown example for detecting radial force fluctuations.

FIG. 1 shows in the upper half in cross-section and in the lower half in an end view a tubeless automobile tire 1 with radial carcass 2 and a master wheel rim 3 having a radial inner seat surface 6a that is slanted at an angle of 5°. The tire is inflated to a pressure of 2.0 bar. The wheel comprising these components is indicated with reference numeral 4. The wheel 4 is pressed downwardly against a measuring device 5 comprised of two rollers 5a and 5b arranged to both sides of the tire zenith Z. At a low pressing force the respective tread surface radius R can be measured. However, the device also allows for measuring radial force fluctuations which in the context of the present invention is preferred. For this purpose, the wheel with a predetermined load averaged over time is forced against the measuring rollers 5a and 5b. At the bearing locations 5c and 5d of the two measuring drums 5a and 5b at least the radial force $F_R$ and optionally also the axial force $F_a$ is measured and is saved in a digital data recording device 7 that cooperates with a computer 8. In the computer 8 the radial force $F_R$ is integrated over a period length (complete angle) is divided by the period length to thereby determine the average radial force. The local radial force fluctuation $\Delta F_R$ is the difference of the local radial force $F_R$ minus the average radial force.

The measuring rollers 5a, 5b are pivotally supported in their transverse plane about pivots 12 so that the measuring device can be adapted to different transverse curvatures of tires. Furthermore, the measuring rollers can have, instead of the shown cylindrical shape, a shape according to which they taper off inwardly for a better conformation to the surface of the tire.

In the shown embodiment the center of the measuring rollers 5a, 5b are positioned axially between the two beads 9l and 9r so that a data blending between the two measuring tracks is required. This type of data processing is performed within the computer 8.

The computer 8 can be arranged, as preferred and as shown in the drawing, downstream of the electronic data recording device 7.

In variations where only one measuring roller 5 is used, this measuring roller must be pressed with the full wheel load against the wheel 4 to be measured.

Preferably, the function of the radial force fluctuation is electronically saved, for example, with a digital data recording device 7. In order to illustrate what is achieved with the inventive method, the data contents of one measuring track will be explained in the following.

Figure 2:
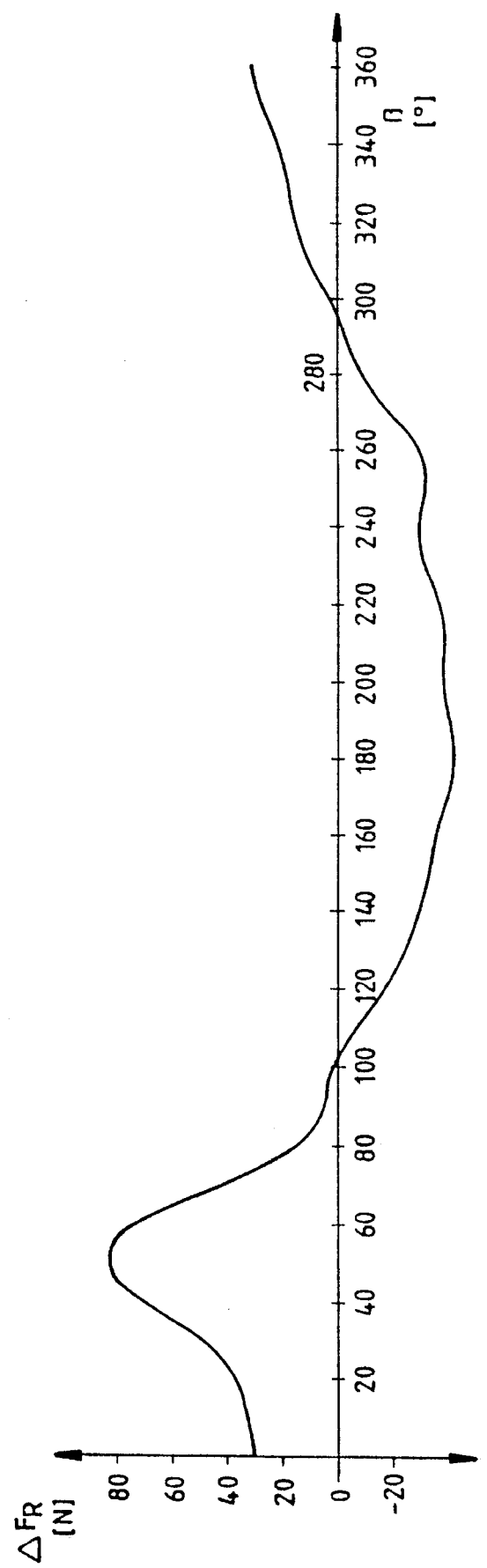
FIG. 2 shows the graph of a radial force fluctuation of an automobile tire before the inventive removal of material at the bead.

FIG. 2 shows a graph of the radial force fluctuations of an automobile tire measured with the aforementioned device before the inventive removal of tire material at the bead. At a rotational angle of 55° a sharp maximum can be detected, and at a rotational angle of approximately 178° a soft minimum can be detected.

The zero axis of the radial force fluctuation is positioned according to the aforementioned data processing such that within the period length the integral of the radial force fluctuation is equal to zero.

Figure 3:
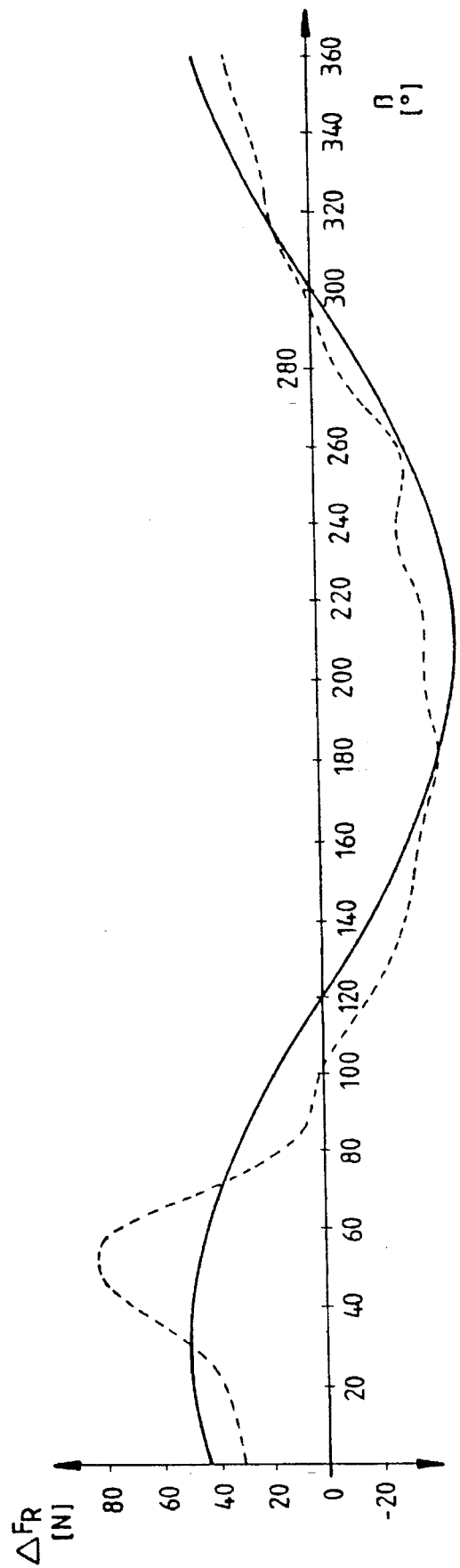
FIG. 3 shows the first harmonic to the graph of FIG. 2.

FIG. 3 shows in a dashed line the aforementioned graph and in a solid line the first harmonic of it. In a manner known to a person skilled in the art, the two Fourier coefficients for the sine, respectively, Cosine function are determined so that the integral over the period length of the error squares is minimized and the two resulting angle functions are combined to a single function with vectorially determined phase position and amplitude (root of the sum of the individual amplitudes squares). This single function is finally plotted.

Figure 4:
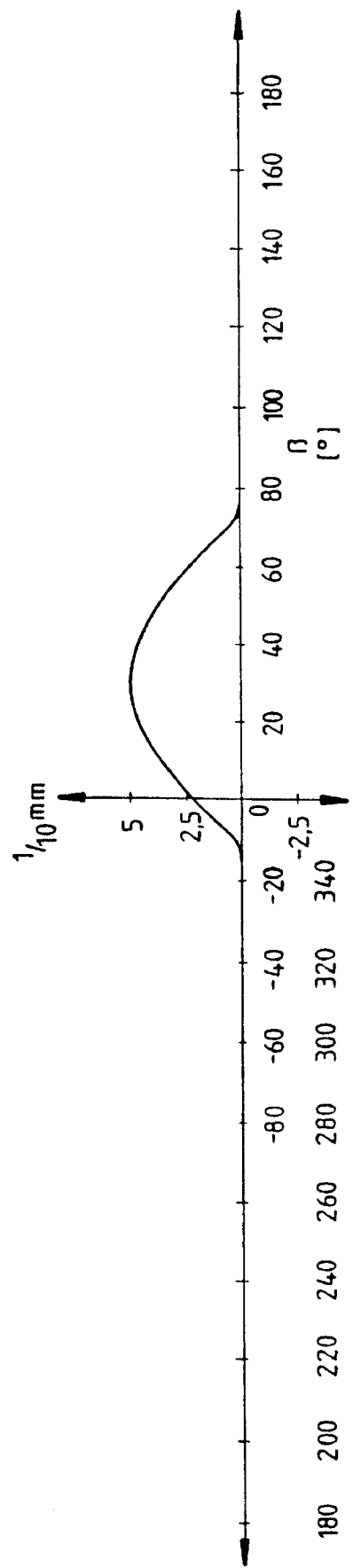
FIG. 4 shows the removal function.

FIG. 4 shows the removal function. The scale on the vertical axis is given in tenth of mm. As a maximum removal 0.5 mm is selected, a value which is conventional for many automobile tires. Furthermore, in this example it is presupposed that 90° of the circumference of the bead can remain unobstructed. In a simple iteration program only the phase position was varied, i.e., the principle curve shape was thus accepted as unchangeable. This is in conformity to practice because the tires, which with a smaller maximum amount of removal would achieve minimal radial force fluctuations, are of a good enough quality without removal, and for tires, which with a greater amount of removal or greater angular ranges could be corrected more precisely, the maximum allowable amount of removal cannot be surpassed in order not to endanger the bead cores and because an enlargement of the angular range is not possible due to lack of core stiffness. The iteratively found angular range extends from −16° to +74°.

Figure 5:
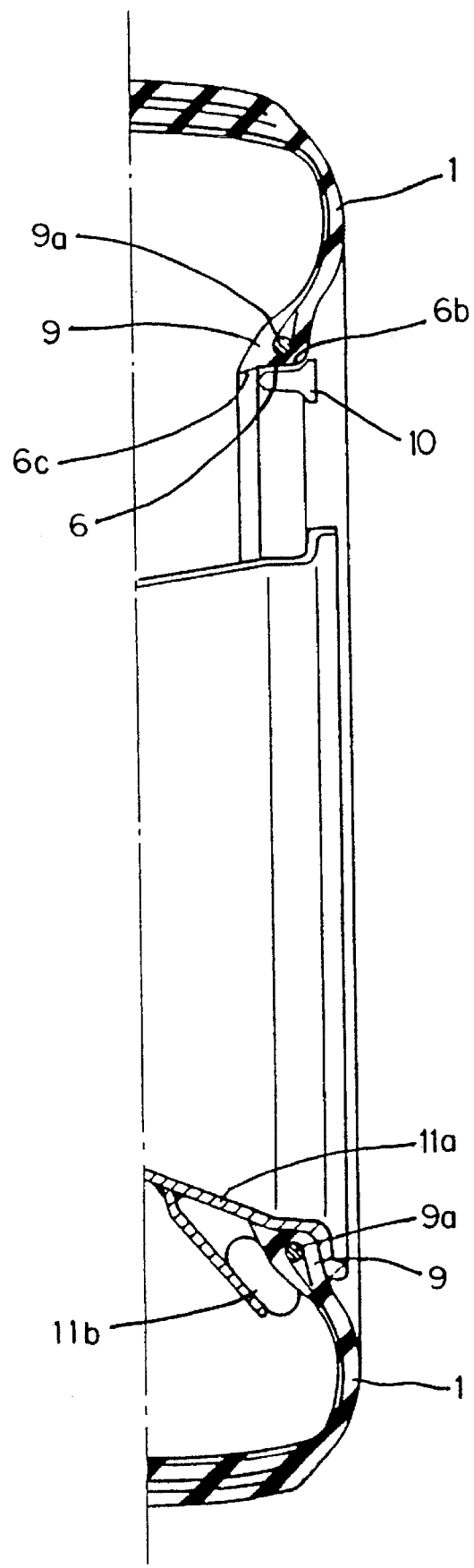
FIG. 5 shows schematically in cross-section the removal tool and the clamping device in a plane transverse to the tire.

FIG. 5 shows the tool 10 designed for performing the inventive removal of material, which is a small roller-shaped rotating grinding stone that is moved on a path by a non-represented system, such as a cam gear system, such that the aforementioned removal function results. Only the axially outer area 6b of the seat surface 6 at the radially inner side of the bead 9 of the tire 1 is machined so that the toe 6c, which is important for the sealing function between tire and wheel rim, remains untouched.

As previously stated, tool 10 may be a laser designed for removal of bead material.

In the lower half of the drawing the clamping device 11 is schematically represented. The clamping device is comprised of a wheel rim fragment 11a and two axially inner clamping jaws (only one is shown in FIG. 5) in the form of inflatable annular hoses 11b which can press the bead 9 against the groove of the wheel rim fragment 11a.

Figure 6:
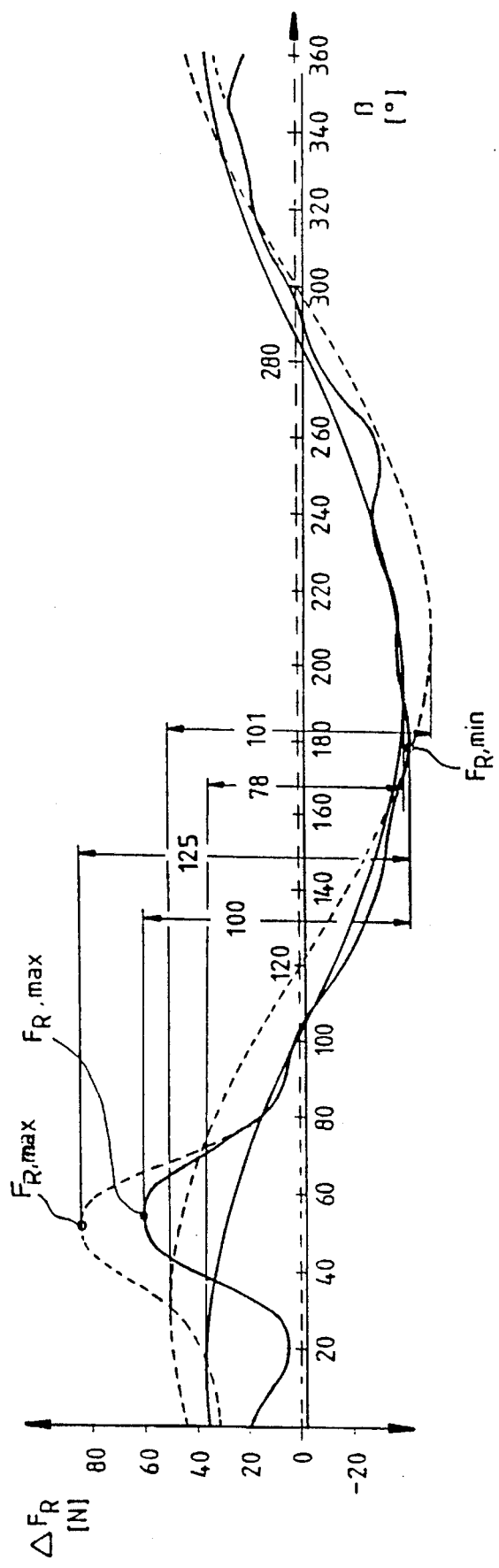
FIG. 6 shows in analogy to FIG. 3 the effect of the inventive removal of material on the radial force fluctuation graph of the finished harmonized tire.

FIG. 6 shows in a dashed line the initial radial force fluctuation, the first harmonic, and the corresponding x-axis as shown in FIG. 3. The solid line represents the radial force fluctuation which results after completion of removal of material. Deviations will result naturally only in the angular ranges of −16°, respectively, +340° to 74°. In the remaining area both radial force fluctuation graphs coincide. The radial force minimum $F_{r,min}$ remains unchanged while the radial force maximum $F_{r,max}$ (the initial maximum is indicated in dashed lines) is lowered by removal.

The corresponding x-axis is at 2.4N, corresponding to the slightly loosened bead characteristics, thus lower than the initial x-axis and is shown in a solid line.

Due to the inventive removal of tire material from the radial inner side of the beads or of a respective bead, the maximum radial force fluctuation has been reduced from 125N to 100N. Accordingly, the amplitude of the first harmonic of the radial force fluctuation has been reduced from 101N to 78N. Thus, the shown tire, without local reduction of the tire tread depth, has achieved highest quality standards.

Thus, it is possible, without compromising the minimum tire tread depth of new tires, to reduce the tire tread thickness of an inventive automobile tire by 0.5 mm. This measure will lower the material costs for the inventive tire and will simultaneously lower the rolling resistance and the heat development and thus also the polymer degradation. In total, the tire quality can thus be increased. With respective other values analog advantages will result for all other classes of vehicle tires, especially also for truck and motorcycle tires. At lower costs it is thus possible to provide a better quality product.

The present invention is, of course, in no way restricted to the specific disclosure of the specification and drawings, but also encompasses any modifications within the scope of the appended claims.

What we claim is:

1. A method for correcting tire imbalance of a tubeless pneumatic vehicle tire, said method comprising the steps of:

mounting a pneumatic vehicle tire on a master wheel rim of great manufacturing precision and having a design that is identical at least in its seat surface to commercial wheel rims for the tubeless pneumatic vehicle tire;

inflating the pneumatic vehicle tire to a pressure within a range of −0.3 bar to +0.2 bar of a maximum operating pressure;

pressing the pneumatic vehicle tire mounted on the master wheel rim against a measuring device;

measuring at least one radial parameter;

recording the values of the radial parameter as a function of the angle of rotation covering the complete range from 0° to 360° of the pneumatic vehicle tire;

determining the maximum and the minimum of the values of the radial parameter;

calculating the difference between the maximum and the minimum;

comparing the difference between the maximum and the minimum with a predetermined threshold value; and correcting the bead of the tire when the difference between the maximum and the minimum is above the threshold value, wherein said correcting step includes the step of removing at locations, where the value of the radial parameter is greater than the minimum plus the threshold value, tire material from the radially inwardly facing seat surface of the bead of the tire at least to such an extent that the remaining tire imbalance is within a given tolerance range.

2. A method according to claim 1, wherein said step of removing includes the step of grinding.

3. A method according to claim 1, wherein said step of removing includes the step of using a laser.

4. A method according to claim 1, wherein said step of removing is carried out only over a circumferential portion of the bead of the pneumatic vehicle tire.

5. A method according to claim 4, further comprising the step of:

before the step of correcting, clamping the tire in a device that receives a portion of the circumferential length of the bead of an angular range of between 200° and 310° in the manner of a wheel rim so that the circumferential portion of the bead from which tire material is to be removed is left unobstructed.

6. A method according to claim 5, further including the steps of:

evaluating the values of the radial parameter as a function of the angle of rotation from 0° to 360° of the pneumatic vehicle tire so as to determine the first harmonic; and selecting the amount of removal of tire material to be within the dimensional limits of the bead and the allowable removal range such that the amplitude of the first harmonic is lowered as much as possible.

7. A method according to claim 6, wherein said step of evaluating includes the step of using Fourier analysis.

8. A method according to claim 1, wherein in said step of measuring at least one radial parameter the radial force is measured.

9. A method according to claim 7, further comprising the step of measuring the axial force.

10. A method according to claim 8, wherein in said step of measuring the radial force is measured in two adjacent tracks, wherein the measured results of the left track affect the removal of tire material at the left bead of the tire and the measured results of the right track affect the removal of tire material at the right bead.

11. A method according to claim 1, wherein in said step of measuring at least one radial parameter the radius is measured.

12. A method according to claim 11, wherein said radius is measured at two locations axially spaced from the zenith of the tire to the left and to the right, wherein the measured values of the left location affect the removal of tire material at the left bead and the measured values of the right location affect the removal of tire material at the right bead.

13. A method according to claim 12, wherein said two locations are substantially positioned above the left and right beads.

14. A device for correcting tire imbalance of a tubeless pneumatic vehicle tire, wherein a pneumatic vehicle tire is mounted on a master wheel rim of great manufacturing precision and having a design that is identical at least in its seat surface to commercial rim wheels for the tubeless pneumatic vehicle tire, the pneumatic vehicle tire is inflated to a pressure within a range of −0.3 bar to +0.2 bar of a maximum operating pressure and the pneumatic vehicle tire mounted on the wheel rim is pressed against a measuring device, at least one radial parameter is measured, the values of the radial parameter as a function of the angle of rotation $\beta$ from 0° to 360° of the pneumatic vehicle tire are recorded and the maximum and the minimum of the values of the radial parameter are determined, the difference between the maximum and the minimum is calculated and compared with a predetermined threshold value, and the bead of the tire is corrected when the difference between the maximum and the minimum is above the threshold value, wherein said correcting step includes the step of removing at locations, where the value of the radial parameter is greater than the minimum plus the threshold value, tire material from the radially inwardly facing seat surface of the bead of the tire at least to such an extent that the remaining tire imbalance is within a given tolerance range, wherein said step of removing is carried out only over a circumferential portion of the bead of the pneumatic vehicle tire; said device comprising:

a clamping device having a support structure designed substantially identical to a wheel rim and having a cutout over a circumferential portion of said support structure; and a tool, for removing tire material, positioned in said cutout.

15. A device according to claim 14, wherein said cutout extends over an angular range of 50° to 160°.

16. A device according to claim 14, wherein said clamping device comprises outer clamping jaws that are shaped identical to a wheel rim seat and inner clamping jaws for receiving the bead of the tire therebetween so as to be fixedly clamped.

17. A device according to claim 16, wherein said inner clamping jaws have an inflatable hose for clamping.

18. A device according to claim 14, wherein said clamping device is comprised of a first part with a first cutout for receiving the right bead of the tire and a second part with a second cutout for receiving the left bead of the tire, said first and said second parts rotatably connected to one another such that said first cutout and said second cutout can be positioned at any desired rotational position relative to one another thereby allowing the removal of tire material at different circumferential locations of the left and the right beads of the tire.

* * * * *